United States Patent [19]

Hunter

[11] 4,104,615
[45] Aug. 1, 1978

[54] FLASHING SIGNAL LIGHT

[75] Inventor: Everest C. Hunter, Syracuse, N.Y.

[73] Assignee: R. E. Dietz Company, Syracuse, N.Y.

[21] Appl. No.: 750,951

[22] Filed: Dec. 16, 1976

[51] Int. Cl.² .............................................. B60Q 1/52
[52] U.S. Cl. ........................................ 340/84; 340/50;
340/87; 350/97; 350/99; 362/35; 362/170;
362/255
[58] Field of Search ...................... 340/50, 87, 84, 98,
340/366 D; 350/288, 97, 99, 100, 101; 362/49,
24, 170, 35, 255

[56] References Cited

U.S. PATENT DOCUMENTS

| 2,810,065 | 10/1957 | Peck | 340/84 X |
|---|---|---|---|
| 2,846,663 | 8/1958 | Heehler et al. | 340/84 |
| 3,139,604 | 6/1964 | Meiners et al. | 340/50 |
| 3,633,161 | 1/1972 | Price | 340/133 |
| 3,710,098 | 1/1973 | Walden | 340/50 |
| 3,764,799 | 10/1973 | Schulz | 340/87 |

Primary Examiner—John W. Caldwell, Sr.
Assistant Examiner—Donnie L. Crosland
Attorney, Agent, or Firm—Bruns & Jenney

[57] ABSTRACT

A flashing signal light that includes a rotatably mounted signal generator formed of a light transmitting material and a non-rotatable source of light adapted to direct light into the generator along its axis of rotation. A pyramid shaped prism is associated with the generator having its apex positioned along the axis of rotation. The prism surfaces intercept the light directed into the generator, split the light into one or more beams and direct the beams towards the exit face of the generator in a plane that is substantially perpendicular to the axis of rotation.

6 Claims, 4 Drawing Figures

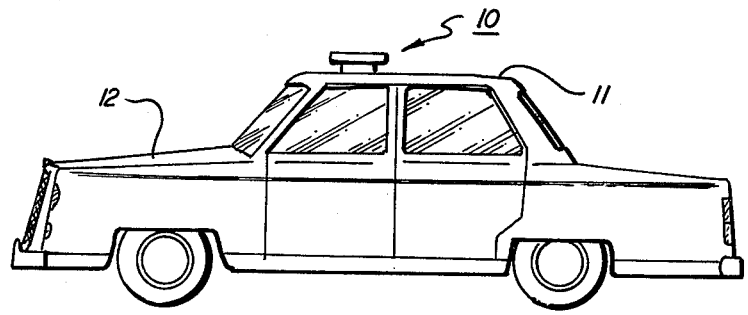
FIG. 1
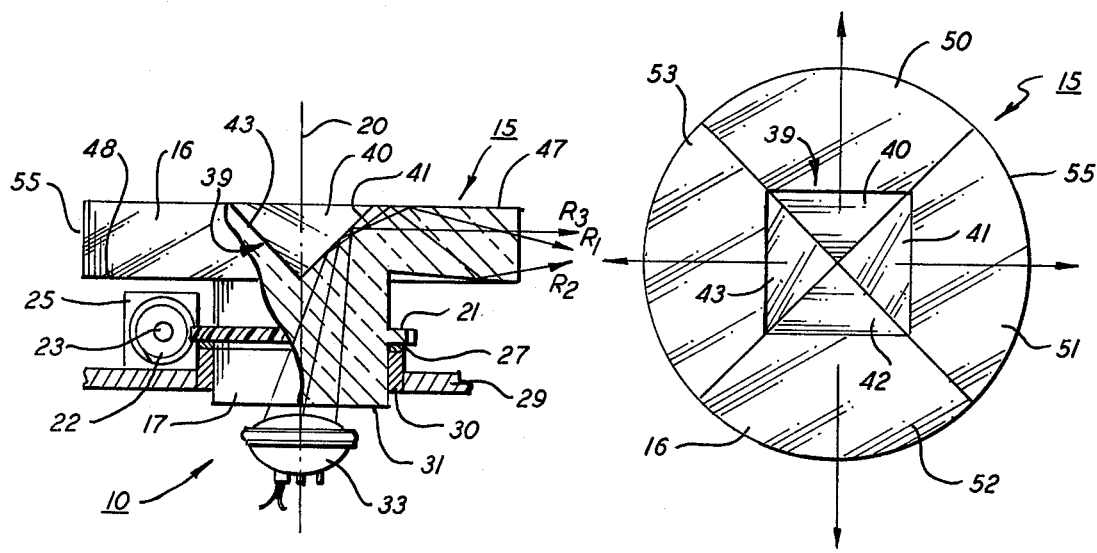
FIG. 2
FIG. 3
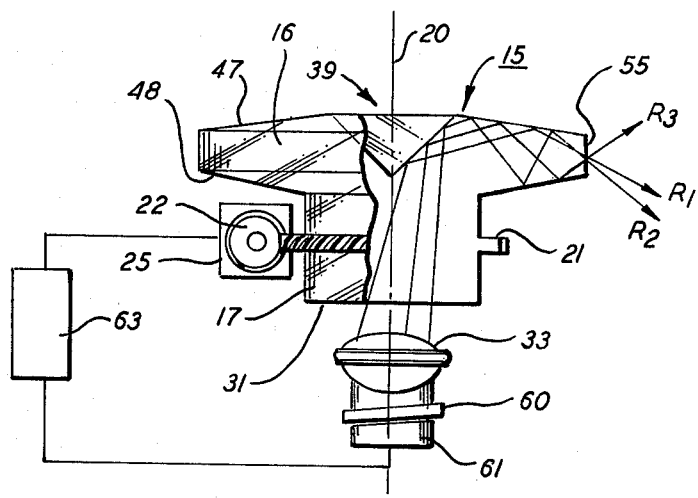
FIG. 4

FLASHING SIGNAL LIGHT

BACKGROUND OF THE INVENTION

This invention relates to a warning or signal light and, in particular, to a flashing signal light suitable for use in conjunction with a moving vehicle or the like.

In most visual warning devices, it is the generally accepted practice to sweep one or more beams of light through a plane of rotation. A flashing or constantly varying signal, emanating from the source, is thus presented to an observer positioned some distance therefrom. In most cases, the beam is rotated within a flat plane to alert the observer while in others the beam may be oscillated above and below the plane of rotation to produce what is called a "wig-wag" signal.

Typically, two techniques are employed to generate a moving light signal and thus create a flashing effect. The most common approach is to simply mount a number of light sources upon a rotatable platform and rotate the entire structure about a common axis of rotation. The main disadvantage associated with this type of device is the problem encountered in providing electrical energy to the individual moving lamps. This usually involves the use of complex and expensive slip ring and bushing connections which are subject to wear and dirt contamination and may also cause radio interference. Furthermore, because of the relative size and weight of the rotating structure, balancing and bearing problems are also encountered. Lastly, in order to protect the complex mechanical and electrical components from environmental contamination, it is not unusual to enclose the entire assembly in a transparent or translucent dome made of thin glass or plastic which is susceptible to breakage.

To overcome the above noted electrical problem, warning devices employing a stationary light source have been devised in which moving reflectors are passed through a stationary light beam to create a flashing effect. Although the need for slip ring connectors is eliminated, the moving structure again tends to be relatively large and complex giving rise to problems generally associated with moving a relatively heavy structure. Because of the complexity of the structure needed to rotate the reflectors it is difficult to position the light source in a location where the source can continually see the reflector surfaces. The light source usually must be positioned some distance from the reflectors and, as a consequence, some of the illumination directed at the moving targets is scattered or lost to unwanted reflections.

SUMMARY OF THE INVENTION

It is therefore an object of the present invention to improve flashing warning lights.

A further object of the present invention is to reduce the complexity and number of electrical and mechanical components required to generate a flashing visual warning signal.

Yet another object of the present invention is to minimize the amount of energy required to produce a flashing warning signal.

A still further object of the present invention is to provide a simple warning device of rugged construction capable of efficiently creating a flashing visual signal.

These and other objects of the present invention are attained by a warning device that includes a rotatably mounted signal generator formed of a light transmitting substance, a non-rotating source of light positioned adjacent to the generator and being arranged to direct light therein along its axis of rotation, an internally contained prism, preferably being pyramid shaped in form with apex of the pyramid lying upon the axis of rotation, positioned to intercept the light directed into the generator and redirect one or more beams of light toward a light exit face whereby the one or more beams of light are moved in a plane of rotation, as the generator rotates about its axis.

BRIEF DESCRIPTION OF THE DRAWINGS

For a better understanding of the present invention as well as other features thereof, the following detailed description of the invention is to be read in conjunction with the following drawings, wherein:

FIG. 1 is a side view of a motor vehicle having an improved signal light constructed in accordance with the teachings of the present invention;

FIG. 2 is a side elevation in partial section showing the instant signal light;

FIG. 3 is a top plan view of the signal light shown in FIG. 2; and

FIG. 4 is a side view in partial section showing a second embodiment of the present invention.

DESCRIPTION OF THE PREFERRED EMBODIMENTS

Referring initially to FIG. 1, there is shown a warning light 10 which embodies the teachings of the present invention mounted in the roof 11 of a motor vehicle 12. It should become apparent from the following disclosure that the apparatus of the present invention has wide application and is not necessarily confined to use in connection with a motor vehicle of the type illustrated. In fact, it is contemplated that the apparatus of the present invention can be utilized in any type of environment, moving or otherwise, where it is desirous or necessary to create a flashing visual signal indicative of potential danger.

In this particular application, the low profile countour of the light complements the roof line of the vehicle to considerably minimize the chances of it being broken and to reduce the aerodynamic drag over the vehicle surface. This latter point is of utmost importance when considering device for use in conjunction with high speed vehicles or aircraft.

Turning now more specifically to FIGS. 2 and 3, the warning device 10 includes a rotatable mounted signal generator, generally referenced 15, which is fabricated of a solid single piece of light transmitting material capable of conducting light internally between a light entrance face and a light exit face by a phenomenon sometimes referred to as "the internal reflection" technique. As is well known in the art, the signal generator can be fabricated from any one of many plastics, such as acrylics or the like, which possesses the desired light retaining and transmitting properties which give to the generator the capable of conducting light internally therethrough.

The signal generator is formed of a cylindrical light guide section 16, of a given diameter, having a dependent cylindrical hub 17 of lesser diameter extending outwardly therefrom. The two cylindrical elements making up the generator are coaxially aligned about a common axis of rotation 20. As will be explained in further detail below, the smaller diameter hub section 17 acts as a light pipe in the system for transporting internally light energy from a stationary source of illumination 33 upwardly into the larger diameter light guide section 16.

In practice, the hub is provided with a pinion gear 21 by which the signal generator is driven about its axis of rotation. As best seen in FIG. 2, the pinion is mated to a worm wheel 22 operatively associated, via shaft 23, with drive motor 25. Preferably the pinion is cast or machined into the base material of the hub to form a strong unitized structure. However, it can also be fabricated from an independent piece of material that is slipped over the hub and secured thereto by any known method such as pinning or the like. Obviously, other means such as a belt drive can be employed to rotate the original generator.

In assembly, the hub is supported in a bearing 30 that is housed within bearing block 29. A gasket 27, mounted over the hub, is interposed between the top surface of the bearing block and the lower surface of the pinion to prevent unwanted foreign matter from passing into the bearing region. The signal generator is supported in the bearing so that it can be moved through 360° by the motor driven pinion. As a result, the radially extended light guide cylinder 16 is rotated in a plane generally perpendicular to the axis of rotation.

The axially extended body of the hub 17 also serves as a light pipe to direct illumination into the cylindrical light guide 16. The bottom surface 31 forms the light entrance face of the illumination system. The entrance face is contoured in regard to the index of refraction of the light conductive material making up the signal generator whereby light directed at the entrance face efficiently passes into the light pipe 17 and is conducted upwardly, toward the light guide 16, generally along a path of travel described by the axis of rotation.

A non-rotating light source 33 is positioned adjacent to the light entrance face to the system and is arranged to direct its illumination directly into the light pipe. As can be seen, the light source is located in very close proximity with the light entrance face whereby substantially all of the light energy available passes into the system where it is subsequently used to generate visual signal. Because the light source can be positioned adjacent to, and in close proximity with, the light entrance face, the light in transit cannot strike surrounding objects and be inadvertently redirected out of the system.

Although almost any suitable light source can be effectively utilized to conjunction with the present invention, it is preferred that the light source take the form of a high intensity sealed beam lamp or a high intensity source of collimated light.

The entering light traveling along the light pipe is directed toward a reflecting prism 39 having one or more reflecting surfaces arranged to redirect the light outwardly within the plane of rotation of the light guide 16. As illustrated in FIGS. 2 and 3, the prism can take the form of an inverted pyramid. The pyramid is generated about the axis of rotation of the signal generator. The apex of the pyramid, formed by the joinder of its planar reflecting surfaces, is positioned on the axis of rotation with the apex pointing at the light entrance face 31 of the generator.

In this specific embodiment, the prism contains four distinct reflecting surfaces 40 through 43 that are arranged to split the entering light into four beams (depicted by the arrows in FIG. 3) equally spaced about the circumference of the light guide.

It should be noted that because the light guide is constructed of a light transmitting material capable of conducting the light by internal reflections, the prism can be simply formed by machining the reflecting surfaces downwardly through the top surface 47 of the light guide 16 to create a pyramid shaped opening therein. Each of the surfaces forms an obtuse angle with the axis of rotation, the angle being related to the index of refraction of the material to prevent light striking the prism surfaces from passing out of the guide. It should also be evident that the number of reflecting surfaces may vary in accordance with the number of beams desired. Similarly, the prism can be formed of a separate piece of material inserted into an opening formed in the top surface of the cylinder 16, the material having a different index of refraction than the guide material.

As seen in FIG. 3, the signal generator can be made in a number of sections such as pie shaped sections 50 through 53 that are secured together by glueing or the like to create a cylindrical assembly describing the signal generator 15. Each section includes two planar walls which meet to form a corner coincidental with the axis of rotation 20. Each section contains one of the planar reflecting surfaces of the prism with each adjacent section being colored differently whereby the redirected beams of light will appear to an observer as a color differentiated visual signal.

Light striking each reflecting surface of the prism is redirected as a beam towards the light exit face 55 of the system. The beams move generally along the plane of rotation described by the light guide as it rotates about the generator's axis of rotation. In this embodiment, the exit face is represented by the circular outer periphery 55 of the light guide 16. However, in practice, the light guide can be formed so that each light beam is provided with its own exit face that is specifically contoured to release illumination incident thereon efficiently from the system. As illustrated schematically in FIG. 2, the light redirected from the prism follows a number of different torturous paths as it moves along the guide toward the exit face. These paths are depicted in the drawings as ray paths $R_1$, $R_2$ and $R_3$. As illustrated, some rays strike the top and bottom surfaces 47, 48 of the light guide as they are conducted therealong and eventually leave the light guide at some angle to the plane of the sidewall. However, to an observer positioned some distance from the signal generator, the net effect is the presentation of a sweeping beam of light.

As can be seen, most if not all of the illumination entering the illumination system is released therefrom in the form of a usable visual signal. Although generally unnecessary, the reflecting surfaces of the guide and prisms can be coated with a mirror film to further enhance the efficiency of the system. The instant warning device, furthermore, is of extremely strong construction and therefore not susceptible to breakage. By the same token the number and complexity of component parts required to develop the flashing signal is considerably reduced when compared to more conventional devices.

A second embodiment of the invention is illustrated in FIG. 4 wherein like reference numbers designate like parts to those previously described in reference to FIGS. 2 and 3. As disclosed above, the signal generator 15 is rotatably supported in a bearing (not shown) so as to rotate about its central axis 20. A source of illumination 33 is positioned adjacent to the light entrance face 31 of the generator and is arranged to direct light at the internal prism 39. As noted above, the prism serves to split the light into a plurality of beams which are directed toward the exit face 55 of the signal generator. It should be noted that in the embodiment, the top and bottom surfaces 47 and 48 of the light guide 16 converge inwardly from the axis of rotation toward the light exit face. Here again, the geometry and material of the signal generator are determined so as to contain the light within the generator as it is being conducted toward the exit face 55. In this embodiment, the light is gathered into a smaller area as it is transmitted down the light guide 16 thereby producing a sharper, more intense image signal.

A camming member 60 is operatively associated with the lamp 33 to uniformly move the lamp with reference to the axis of rotation. The motion prescribed by the cam causes the light beams generated by the prism to move harmonically above and below the plane of rotation described by the light guide. This, in turn, creates a signal that not only sweeps past the observer's eye but also oscillates to produce a "wig-wag" effect. The camming means 60 is operated by means of an electrical drive 61 which communicates with the signal generator drive 25 via electrical regulator 63. The regulator controls the operation of the cam drive in reference with the motion of the signal generator to establish the desired wig-wag presentation. As can be seen, the complex wig-wag effect is herein created optically rather than mechanically, thereby reducing the size and complexity of the mechanism involved.

While this invention has been described with reference to the structure disclosed herein, it is not confined to the details as set forth and this application is intended to cover any modifications or changes that may come within the scope of the following claims.

I claim:

1. A warning device for creating a moving visual signal including
    a rotatably mounted signal generator constructed of a light transmitting material capable of conducting light internally, said generator being formed of two cylindrical sections coaxially aligned along the central axis of the generator with a first section being of greater diameter than a second section,
    a stationary source of illumination positioned adjacent to and in close proximity with the end face of the second cylindrical section whereby light from said source is directed into the generator through said end face along the central axis of said generator,
    a plurality of reflecting surfaces formed in the first cylindrical section being arranged to intercept the light directed into said generator and redirect the light internally within a plane substantially normal to the axis of said generator whereby a plurality of light beams, equal in number to the number of reflecting surfaces, exit said generator through the cylindrical outer periphery of the first cylindrical section, and
    drive means operatively associated with the generator for rotating the generator about its axis whereby the beams of light exiting the generator are swept through a circular path of travel normal to the axis of rotation.

2. The warning device of claim 1 further including repositioning means operatively associated with said source of illumination for angularly repositioning the source periodically in respect to the axis of the generator whereby said exiting light beams are moved above and below the circular path of travel normal to the axis of rotation.

3. The warning device of claim 2 further including means to coordinate the operation of the repositioning means in response to the angular position of the signal generator whereby
    the light beams move harmonically above and below said circular path of travel.

4. The warning device of claim 1 wherein said reflecting surfaces form a pyramid shaped opening in the end face of said first cylindrical section with the apex of the pyramid lying upon the axis of rotation and pointing at the source of illumination.

5. The warning device of claim 4 wherein the generator is formed of a plurality of pie shaped segments the apex of which are aligned along the axis of the generator with each segment containing one of said reflecting surfaces.

6. The warning device of claim 5 wherein each adjacent segment is formed of a different colored material whereby the visual signal presented to an observer changes color as it sweeps through said circular path of travel.

* * * * *